United States Patent
Funahashi

(10) Patent No.: US 9,481,784 B2
(45) Date of Patent: Nov. 1, 2016

(54) RUBBER COMPOSITION FOR ANTI-VIBRATION RUBBER

(71) Applicant: TOYO TIRE & RUBBER CO., LTD., Osaka-shi, Osaka (JP)

(72) Inventor: Hiroyasu Funahashi, Osaka (JP)

(73) Assignee: TOYO TIRE & RUBBER CO., LTD., Osaka-Shi (JP)

( * ) Notice: Subject to any disclaimer, the term of this patent is extended or adjusted under 35 U.S.C. 154(b) by 0 days.

(21) Appl. No.: 14/759,185

(22) PCT Filed: Dec. 24, 2013

(86) PCT No.: PCT/JP2013/084450
§ 371 (c)(1),
(2) Date: Jul. 2, 2015

(87) PCT Pub. No.: WO2014/109219
PCT Pub. Date: Jul. 17, 2014

(65) Prior Publication Data
US 2015/0337123 A1 Nov. 26, 2015

(30) Foreign Application Priority Data

Jan. 9, 2013 (JP) .................................. 2013-001981

(51) Int. Cl.
C08L 7/00 (2006.01)
C08F 136/08 (2006.01)
C08C 19/20 (2006.01)
C08L 9/00 (2006.01)

(52) U.S. Cl.
CPC .................. *C08L 7/00* (2013.01); *C08C 19/20* (2013.01); *C08F 136/08* (2013.01); *C08L 9/00* (2013.01); *C08L 2205/02* (2013.01); *C08L 2205/025* (2013.01); *C08L 2205/03* (2013.01)

(58) Field of Classification Search
CPC ........ C08L 9/00; C08L 7/00; C08L 2205/02; C08L 2205/025; C08L 2205/03; C08F 136/08; C08C 19/20; C08K 3/06
See application file for complete search history.

(56) References Cited

U.S. PATENT DOCUMENTS

| | | | | |
|---|---|---|---|---|
| 5,087,668 A | * | 2/1992 | Standstrom | C08L 7/00 152/905 |
| 5,300,577 A | * | 4/1994 | DiRossi | C08L 7/00 152/905 |
| 5,627,237 A | * | 5/1997 | Halasa | B60C 1/0016 152/905 |
| 2005/0245682 A1 | | 11/2005 | Ikeda | |
| 2008/0227921 A1 | * | 9/2008 | McGlothlin | C08J 5/18 525/333.1 |
| 2015/0144242 A1 | * | 5/2015 | Lagarde, Jr. | C08L 7/00 152/541 |

FOREIGN PATENT DOCUMENTS

| | | |
|---|---|---|
| JP | 598737 A | 1/1984 |
| JP | 026544 A | 1/1990 |
| JP | 481437 A | 3/1992 |
| JP | 2005213429 A | 8/2005 |
| JP | 2006257254 A | 9/2006 |
| JP | 2007262310 A | 10/2007 |
| JP | 2008050616 A | 3/2008 |
| JP | 2009269967 A | 11/2009 |
| WO | 2004011551 A1 | 2/2004 |
| WO | 2007114062 A1 | 10/2007 |

OTHER PUBLICATIONS

An Extended European Search Report dated Nov. 18, 2015, issued for corresponding European patent application No. 13870924.1.
International Search Report (ISR) mailed Apr. 8, 2014, issued for International application No. PCT/JP2013/084450.
A First Office Action issued by the State Intellectual Property Office of China, mailed Jan. 25, 2016, with a search report for Chinese counterpart application No. 201380063233.X.
A Notification of Reasons for Refusal issued by the Japanese Patent Office, mailed Apr. 27, 2016, for Japanese counterpart application No. 2013-001981.

* cited by examiner

*Primary Examiner* — Nathan M Nutter
(74) *Attorney, Agent, or Firm* — Law Office of Katsuhiro Arai

(57) ABSTRACT

A rubber composition for anti-vibration rubber, comprising rubber components, the rubber composition comprising 4 to 40 parts by weight of the following component out of the rubber components when the whole amount of the rubber components is regarded as 100 parts by weight: a lithium catalyst-type polyisoprene rubber.

3 Claims, No Drawings

RUBBER COMPOSITION FOR ANTI-VIBRATION RUBBER

This application is the U.S. National Phase under 35 U.S.C. §371 of International Application PCT/JP2013/084450, filed Dec. 24, 2013, which claims priority to Japanese Patent Application No. 2013-001981, filed Jan. 9, 2013. The International Application was published under PCT Article 21(2) in a language other than English.

TECHNICAL FIELD

The present invention relates to a rubber composition for anti-vibration rubber that contains rubber components.

BACKGROUND ART

In recent years, automobiles have been heightened in power while required to be quiet machines. Moreover, automobiles are used in various environments, and may be used in districts high in external air temperature, such as Southeast Asia or countries in the Middle East or may be used in cold districts. In general, automobiles having an anti-vibration rubber made mainly of a natural rubber and improved in heat resistance encounter no especial problems when used in a district high in external air temperature, but may encounter the following problem when left as they are in a cold district over a long term: a problem that an abnormal vibration is caused when their engine is restarted. This would be caused that when the anti-vibration rubber is exposed to a very low temperature (for example, about −30° C.), the rubber rises in dynamic spring constant to be remarkably lowered in functionality as an anti-vibration rubber. Accordingly, when the quietness of automobiles is considered, it is desired in the actual circumstances to develop a rubber composition for anti-vibration rubber in which a variation in the dynamic spring constant of a rubber is small, in particular, at low temperatures.

As described above, a rubber composition has been generally used which is made mainly of a natural rubber as a rubber component for rubber composition for anti-vibration rubbers. The following technique is known as a technique for decreasing a variation in the dynamic spring constant of a vulcanized rubber made from a rubber composition containing such a rubber component: a technique of increasing the proportion of the amount of a sulfur-based vulcanizing agent in the rubber composition. According to this technique, the anti-vibration rubber tends to be deteriorated in heat resistance so that the rubber does not easily attain compatibility between heat resistance and a restraint of a change with time in the dynamic spring constant in a low-temperature range.

In order to restrain the so-called Mullins effect, i.e., a phenomenon that a rubber is lowered in elastic modulus when repeatedly deformed, Patent Document 1 listed below describes a technique of adjusting, to 50% by mass or more, the proportion by mass of a high-cis isoprene rubber made of a Ziegler catalyst-type isoprene rubber, or a lithium catalyst-type isoprene rubber in all rubber components. However, regarding the invention described in this document, it is assumed that the use of the rubber is for seismic isolation structures, but not assumed in the actual circumstances that the use thereof is in a very low temperature range. Furthermore, a heat resistance level required for the use of the rubber is also lower than that for the use of anti-vibration rubber.

PRIOR ART DOCUMENT

Patent Document

Patent Document 1: JP-A-2009-269967

SUMMARY OF THE INVENTION

Problems to be Solved by the Invention

In light of the actual circumstances, the present invention has been made, and an object thereof is to provide a rubber composition for anti-vibration rubber that can attain compatibility between heat resistance over a long term and a restraint of a change with time in dynamic spring constant in a very low temperature range.

Means for Solving the Problems

In order to solve the above-mentioned problems, the inventors have made eager investigations to find out that the object can be attained according to a rubber composition described below for anti-vibration rubber. Thus, the present invention has been achieved.

Accordingly, the present invention is a rubber composition for anti-vibration rubber, comprising rubber components, the rubber composition comprising 4 to 40 parts by weight of the following component out of the rubber components when the whole amount of the rubber components is regarded as 100 parts by weight: a lithium catalyst-type polyisoprene rubber (hereinafter referred to also as a Li-based polyisoprene rubber). In the invention, the "lithium catalyst-type polyisoprene rubber" denotes a synthetic polyisoprene rubber synthesized using a lithium catalyst.

The rubber composition for anti-vibration rubber according to the invention contains, when the whole amount of its rubber components is regarded as 100 parts by weight, a Li-based polyisoprene rubber in an amount of 4 parts by weight or more. This manner makes it possible to restrain the composition from being changed with time in dynamic spring constant in a very low temperature range. The reason why this advantageous effect is obtained is unclear, however, the reason is presumed as follows: the polymer that the Li-based polyisoprene rubber has is lowered in molecular mobility by a microstructure of the polymer, so that the polymer is hindered from being crystallized at low temperature; thus, the rubber composition can be restrained from being changed with time in dynamic spring constant in a very low temperature range. In the invention, the "very low temperature" denotes a range from −40 to −20° C., particularly, from −35 to 25° C.

When the whole amount of the rubber components is regarded as 100 parts by weight in the rubber composition for anti-vibration rubber according to the present invention, the content of the Li-based polyisoprene rubber is set to 40 parts by weight or less. With an increase of the content of the Li-based polyisoprene rubber, the rubber composition can be more effectively restrained from being changed with time in dynamic spring constant in a very low temperature range. However, if the content of the Li-based polyisoprene rubber in the rubber composition for anti-vibration rubber is more than 40 parts by weight, the rubber composition is largely changed with time in heat resistance to be deteriorated in heat resistance over a long term.

It is preferred that the rubber composition for anti-vibration rubber further contains 30 to 80 parts by weight of the following component out of the rubber components: a Ziegler catalyst-type polyisoprene rubber (hereinafter referred to also as a "Ti-based polyisoprene rubber"). When the rubber composition for anti-vibration rubber contains, together with the Li-based polyisoprene rubber, the Ti-based polyisoprene rubber in the predetermined blend proportion, the rubber composition can attain, with a good balance, compatibility between heat resistance over a long term and a restraint of a change with time in dynamic spring constant in a very low temperature range.

It is preferred that the rubber composition for anti-vibration rubber contains 10 to 30 parts by weight of the following component out of the rubber components: a polybutadiene rubber. This manner makes it possible to provide an anti-vibration rubber which can be decreased in dynamic magnification and is excellent in quietness.

It is preferred that the rubber composition for anti-vibration rubber further contains a sulfur-based vulcanizing agent in an amount of less than 0.6 parts by weight for 100 parts by weight of the rubber components. This manner makes it possible to decrease the rubber in hardness variation in a very low temperature range while the rubber is prevented from being deteriorated in heat resistance.

MODE FOR CARRYING OUT THE INVENTION

In order that the rubber composition for anti-vibration rubber according to the present invention can attain compatibility between heat resistance over a long term and a restraint of a change with time in dynamic spring constant in a very low temperature range, at the time of regarding the whole amount of its rubber components as 100 parts by weight, it is important for the rubber composition to contain 4 to 40 parts by weight of the following component out of the rubber components: a Li-based polyisoprene rubber. In order that the rubber composition can attain, with a better balance, compatibility between heat resistance over a long term and a restraint of a change with time in dynamic spring constant in a very low temperature range, the rubber composition contains the following component out of the rubber components in an amount of preferably from 30 to 80 parts by weight, more preferably from 60 to 80 parts by weight: a Ti-based polyisoprene rubber.

In order to cause the rubber composition to ensure anti-vibrating properties and low temperature properties sufficiently, the polyisoprene rubbers each have a Moony viscosity $ML_{1+4}$ (at 100° C.) of 60 to 100. From the same viewpoint, the polyisoprene rubber preferably has a number average molecular weight of 2000 to 1500000. The Moony viscosity $ML_{1+4}$ (at 100° C.) can be measured in accordance with JIS K6300 (L-shaped rotor) under conditions that the pre-heating period is 1 minute, the measuring period is 4 minutes and the temperature is 100° C. The number average molecular weight can be obtained by making a measurement therefor using GPC (gel permeation chromatography) under conditions described below, and then calculating out the resultant value in terms of the number average molecular weight of standard polystyrene.

GPC apparatus: LC-10A, manufactured by Shimadzu Corporation.

Columns: the use of the following three columns linked to each other: columns (PLgel, 5 μm, 500 angstrom), (PLgel, 5 μm, 100 angstrom) and (PLgel, 5 μm, 50 angstrom) manufactured by Polymer Laboratories Ltd.

Flow rate: 1.0 mL/min.
Concentration: 1.0 g/L
Injected amount: 40 μL
Column temperature: 40° C.
Eluent: Tetrahydrofuran In the present invention, the rubber composition may contain, for example, a natural rubber and/or a different diene synthetic rubber as far as the composition contains the Li-based polyisoprene rubber within the above-mentioned range. Specific examples thereof include polybutadiene rubber (BR), styrene-butadiene rubber (SBR), butyl rubber (IIR), and acrylonitrile-butadiene rubber (NBR). In a case where the rubber composition contains 10 to 30 parts by weight of polybutadiene rubber (BR) out of these diene synthetic rubbers when the whole amount of the rubber components is regarded as 100 parts by weight, an anti-vibration rubber can be favorably provided which can be decreased in dynamic magnification and is excellent in quietness.

The rubber composition according to the present invention preferably contains, besides the rubber components, a sulfur-based vulcanizing agent. It is sufficient for the sulfur-based vulcanizing agent to be an ordinary sulfur species for rubber. The vulcanizing agent may be, for example, powdery sulfur, precipitated sulfur, insoluble sulfur, or highly-dispersible sulfur. The sulfur content of the rubber composition for anti-vibration rubber according to the invention is preferably small in order to prevent deterioration of heat resistance. Specifically, the amount thereof is preferably less than 0.6 parts by weight, more preferably less than 0.3 parts by weight for 100 parts by weight of the rubber components. If the amount of the sulfur-based vulcanizing agent is too small, the resultant vulcanized rubber is short in crosslinkage density to be unfavorably lowered in strength and others. It is therefore preferred that the amount of the sulfur-based vulcanizing agent is 0.1 parts by weight or more for 100 parts by weight of the rubber components.

Together with the rubber components and the sulfur-based vulcanizing agent, the following may be appropriately used and blended into the rubber composition of the present invention for anti-vibration rubber as far as the advantageous effects of the invention are not damaged: a vulcanizing promoter, carbon black, silica, a silane coupling agent, zinc oxide, stearic acid, a vulcanization promoting aid, a vulcanizing retarder, an anti-aging agent, a softener such as wax or oil, a working aid, and other blenders used ordinarily in the rubber industry.

The species of carbon black may be, for example, SAF, ISAF, HAF, FEF, or GPF. Carbon black can be used as far as the use permits rubber properties of the vulcanized rubber to be adjusted, examples of the properties including the hardness, reinforceability, and low thermogenic property thereof. The blend amount of carbon black is preferably from 10 to 80 parts by weight, more preferably from 15 to 75 parts by weight for 100 parts by weight of the rubber components. If this blend amount is less than 10 parts by weight, carbon black may not produce a sufficient reinforcing effect. If the amount is more than 80 parts by weight, carbon black may deteriorate the rubber composition in thermogenic property, rubber blendability, workability in the working of the composition, and others.

Examples of the vulcanizing promoter include sulfenamide based, thiuram based, thiazole based, thiourea based, guanidine based, and dithiocarbamate based vulcanizing promoters, and other vulcanizing promoters used ordinarily for rubber-vulcanization. These promoters may be used alone or in the form of any appropriate mixture of two or more thereof.

Examples of the anti-aging agent include aromatic amine based, amine-ketone based, mono-phenol based, bis-phenol based, polyphenol based, dithiocarbamate based, and thiourea based anti-aging agents. These agents may be used alone or in the form of any appropriate mixture of two or more thereof.

The rubber composition of the present invention for anti-vibration rubber can be obtained by mixing and kneading the rubber components, the sulfur-based vulcanizing agent, and one or more optional components such as carbon black, silica, a silane coupling agent, zinc oxide, stearic acid, a vulcanizing promoter, an anti-aging agent, and/or wax, using a mixing and kneading machine usable in an ordinary rubber industry, such as a Banbury mixer, a kneader or a roll.

The method for blending the above-mentioned individual components with each other is not particularly limited, and may be any one of the following methods: a method of kneading blend components other than the sulfur-based vulcanizing agent, the vulcanizing promoter and other vulcanization-based components in advance into a master batch, adding the rest of the individual components thereto, and further kneading the resultant; a method of adding the individual components into the machine in an arbitrary order, and then kneading the components; a method of adding the entire components simultaneously, and kneading the components; and other methods.

After the above-mentioned kneaded individual components are worked into a shape, the shaped product is vulcanized to make it possible to produce an anti-vibration rubber compatible between heat resistance over a long term and a restraint of a change with time in dynamic spring constant in a very low temperature region. This anti-vibration rubber is usable suitably for anti-vibration rubbers for automobiles, such as an engine mount, a torsional damper, a body mount, a cap mount, a member mount, a strut mount and a muffler mount, anti-vibration rubbers for railway trains, anti-vibration rubbers for industrial machines, seismic isolation rubbers for buildings, seismic isolation rubber supports or bearings, and any other anti-vibration rubber or seismic isolation rubber. The anti-vibration rubber is useful, particularly, for an engine mount, or any other constituting member of an anti-vibration rubber for an automobile, the member being a member for which heat resistance is required.

EXAMPLES

Hereinafter, this invention will be more specifically described by demonstrating examples of the invention.
Preparation of Rubber Compositions:

A rubber composition of each of Examples 1 to 3 and Comparative Examples 1 to 3 was blended into 100 parts by weight of rubber components in accordance with a blend formulation shown in Table 1. An ordinary Banbury mixer was then used to knead the resultant and thereby to prepare a rubber composition. Respective details of the blend agents described in Table 1 are as follows:

a) Rubber Components
- Li-based polyisoprene rubber (Li-IR): synthetic polyisoprene rubber ("IR 307", manufactured by Kraton Performance Polymers Inc., "Moony viscosity ($ML_{1+4}$ (100° C.))"=68, cis-1,4 bond proportion: 89.5%, trans-1,4 bond proportion: 6.7%, 3,4-vinyl bond proportion: 3.8%, and number average molecular weight Mn=700000),
- Ti-based polyisoprene rubber (Ti-IR): synthetic polyisoprene rubber ("IR 2200", manufactured by JSR Corporation, "Moony viscosity ($ML_{1+4}$ (100° C.))"=82, cis-1,4 bond proportion: 98.5%, trans-1,4 bond proportion: 1.5%, 3,4-vinyl bond proportion: 0%, and number average molecular weight Mn=300000),
- Polybutadiene rubber (BR) ("CB 22", manufactured by Lanxess AG, "Moony viscosity ($ML_{1+4}$ (100° C.))"=63, cis-1,4 bond proportion: 96%, and number average molecular weight Mn=250000), and
- Natural rubber (NR): RSS#3 ("Moony viscosity ($ML_{1+4}$ (100° C.))"=70, cis-1,4 bond proportion: about 100%, and number average molecular weight Mn=1000000);

b) Sulfur-based vulcanizing agent: 5% oil-treated sulfur;
c) Carbon black: GPF ("SEAST V", manufactured by Tokai Carbon Co., Ltd.);
d) Zinc oxide: zinc flower No. 3;
e) Stearic acid: stearic acid for industries;
f) Working aid: OZOACE-2701, manufactured by NIPPON SEIRO CO., LTD.;
g) Anti-aging agents:
  (A) imidazole based anti-aging agent: zinc salt of 2-mercaptobenzimidazole ("NOCRAC MBZ", manufactured by OUCHI SHINKO CHEMICAL INDUSTRIAL CO., LTD.),
  (B) amine-ketone based anti-aging agent: 2,2,4-trimethyl-1,2-dihydroquinoline polymer ("NOCRAC 224", manufactured by OUCHI SHINKO CHEMICAL INDUSTRIAL CO., LTD.), and
  (C) aromatic amine based anti-aging agent: N-phenyl-N'-(1,3-dimethylbutyl)-p-phenylenediamine) ("NOCRAC 6C", manufactured by OUCHI SHINKO CHEMICAL INDUSTRIAL CO., LTD.)
h) Vulcanizing promoters:
  (A) Thiuram based vulcanizing promoter: tetramethylthiuram disulfide ("NOCCELER TT-P (TT)", manufactured by OUCHI SHINKO CHEMICAL INDUSTRIAL CO., LTD.), and
  (B) Thiazole based vulcanizing promoter: di-2-benzothiazolyl disulfide ("NOCCELER DM-P(DM)", manufactured by OUCHI SHINKO CHEMICAL INDUSTRIAL CO., LTD.);
i) Crosslinking aid: bismaleimide compound, N,N'-(4,4-diphenylmethane)bismaleimide ("BMI-HS", manufactured by KI Chemical Industry Co., Ltd.); and
j) Oil: JOMO PROCESS NC-140, manufactured by Japan Energy Corporation.

Evaluations:

A predetermined mold was used to heat and vulcanize each of the rubber compositions at 160° C. for 20 minutes. The resultant sample rubbers were evaluated.

<Dynamic Spring Constant and Dynamic Magnification>

In accordance with JIS-K 6385, the rubber composition was measured about the dynamic spring constant and static spring constant thereof. Furthermore, from the ratio between the former and the latter, the dynamic magnification was calculated out. About the dynamic magnification, it is demonstrated that as the compositions are smaller in numerical value thereof, the compositions are better in anti-vibrating performance. The results are shown in Table 1.

<Change with Time in Dynamic Spring Constant in Very Low Temperature Range (Low Temperature Property)>

A sample of 50 mm in diameter and 25 mm in height, out of the samples of the rubber composition, was used to measure the dynamic spring constant at an initial compression of 0.25 mm, an amplitude of 0.5 mm and a frequency of 100 Hz not to break crystals therein, and further measure the constant after the sample was kept at −30° C. 240 hours. The change magnification of the latter to the former, which was initially measured at normal temperature, was obtained. It is demonstrated that the compositions are lower in change magnification, the compositions are smaller in change with time in dynamic spring constant in a very low temperature region to be better. The results are shown in Table 1.

<Compressive Permanent Set>

In accordance with JIS-K 6262, some of the sample rubbers of the rubber composition were allowed to stand still at 100° C. for 500 hours. The measured results of the rubbers were used. It is demonstrated that as the compositions are smaller in the numerical value of compressive permanent set, the compositions are better in exhaustion resistance. The results are shown in Table 1.

<Elongation Change Ratio (%) at Cutting (Heat Resistance)>

In accordance with JIS-K 6251 and JIS-K 6257, some of the rubber samples of the rubber composition were measured about the elongation at cutting before thermally aged and that after thermally aged at 100° C. for 2000 hours. The change ratio (%) of the latter elongation to the former elongation was measured. It is demonstrated that the compositions are lower in change ratio, the compositions are better in heat resistance over a long term. The results are shown in Table 1.

TABLE 1

|  | Comparative Example 1 | Comparative Example 2 | Example 1 | Example 2 | Example 3 | Comparative Example 3 |
| --- | --- | --- | --- | --- | --- | --- |
| Natural rubber (RSS#3) | 80 | — | — | — | — | — |
| Butadiene rubber | 20 | 20 | 20 | 20 | 20 | 20 |
| Ti-based polyisoprene rubber | — | 80 | 75 | 70 | 40 | — |
| Li-based polyisoprene rubber | — | — | 5 | 10 | 40 | 80 |
| Carbon black (GPF) | 27 | 27 | 27 | 27 | 27 | 27 |
| Oil | 5 | 5 | 5 | 5 | 5 | 5 |
| Zinc flower No. 3 | 5 | 5 | 5 | 5 | 5 | 5 |
| Stearic acid | 1 | 1 | 1 | 1 | 1 | 1 |
| Working aid | 2 | 2 | 2 | 2 | 2 | 2 |
| Anti-aging agent A | 2 | 2 | 2 | 2 | 2 | 2 |
| Anti-aging agent B | 2 | 2 | 2 | 2 | 2 | 2 |
| Anti-aging agent C | 2 | 2 | 2 | 2 | 2 | 2 |
| Sulfur | 0.2 | 0.2 | 0.2 | 0.2 | 0.2 | 0.2 |
| Vulcanizing promoter A | 0.6 | 0.6 | 0.6 | 0.6 | 0.6 | 0.6 |
| Vulcanizing promoter B | 2 | 2 | 2 | 2 | 2 | 2 |
| Crosslinking aid A | 1.5 | 1.5 | 1.5 | 1.5 | 1.5 | 1.5 |
| Dynamic spring constant change magnification after the sample was kept at −30° C. 240 hours | 35 times | 20 times | 8.4 times | 4.9 times | 2.5 times | 2.3 times |
| Dynamic magnification | 1.42 | 1.37 | 1.37 | 1.36 | 1.34 | 1.33 |
| Compressive permanent set (%) | 40 | 38 | 38 | 38 | 38 | 38 |
| Elongation change ratio (%) at cutting | −49 | −47 | −45 | −46 | −47 | −55 |
| Low-temperature property (at −30° C. for 240 hours) | x | x | ○ | ○ | ○ | ○ |
| Heat resistance (at 100° C. for 2000 hours) | ○ | ○ | ○ | ○ | ○ | x |

From the results in Table 1, it is understood that in the vulcanized rubbers according to Examples 1 to 3, a change with time in the dynamic spring constant thereof is sufficiently restrained as compared with that of the vulcanized rubbers according to Comparative Examples 1 and 2 in a very low temperature range. It is understood that Comparative Example 3 is too large in blend proportion of the Li-based polyisoprene rubber so that this example is deteriorated in heat resistance over a long term.

The invention claimed is:

1. A rubber composition for anti-vibration rubber, comprising rubber components,
   the rubber composition comprising:
   4 to 40 parts by weight of the following component out of the rubber components when the whole amount of the rubber components is regarded as 100 parts by weight: a lithium catalyst-type polyisoprene rubber composed of a cis-1,4 bond component, a trans-1,4 bond component, and 3,4-vinyl bond component;
   30 to 80 parts by weight of the following component out of the rubber components: a Ziegler catalyst-type polyisoprene rubber; and
   10 to 30 parts by weight of the following component out of the rubber components: a polybutadiene rubber.

2. The rubber composition for anti-vibration rubber according to claim 1, further comprising a sulfur-based vulcanizing agent in an amount of less than 0.6 parts but no less than 0.1 parts by weight for 100 parts by weight of the rubber components.

3. The rubber composition for anti-vibration rubber according to claim 1, wherein the lithium catalyst-type polyisoprene rubber has a cis-1,4 bond content of 89.5%, a trans-1,4 bond content of 6.7%, and a 3,4-vinyl bond content of 3.8%.

* * * * *